Jan. 30, 1968     H. HANSEN     3,365,758
SEPARABLE SLIDE FASTENER Filed Jan. 3, 1966     8 Sheets-Sheet 2

INVENTOR
Harry Hansen

BY Watson, Cole, Grindle & Watson
ATTORNEYS

Jan. 30, 1968 H. HANSEN 3,365,758
SEPARABLE SLIDE FASTENER
Filed Jan. 3, 1966 8 Sheets-Sheet 3

INVENTOR
Harry Hansen

BY Watson, Cole, Grindle & Watson
ATTORNEYS

Jan. 30, 1968   H. HANSEN   3,365,758
SEPARABLE SLIDE FASTENER
Filed Jan. 3, 1966   8 Sheets-Sheet 7

Fig.14   Fig.15

INVENTOR
Harry Hansen

BY Watson, Cole, Grindle & Watson
ATTORNEYS

Fig.16     Fig.17

United States Patent Office 3,365,758
Patented Jan. 30, 1968

3,365,758
SEPARABLE SLIDE FASTENER
Harry Hansen, Hoffdingsvej 14, Valby,
Copenhagen, Denmark
Filed Jan. 3, 1966, Ser. No. 518,076
Claims priority, application Denmark, Dec. 28, 1965,
6,638/65
7 Claims. (Cl. 24—205.11)

ABSTRACT OF THE DISCLOSURE

This invention relates to an open-end fitting for a separable slide fastener in which the coupling links are of the continuous filament type in the form of helical or meander shaped loops. The open-end fitting comprises a channel shaped terminal member attached to each of said tapes to form a termination of the respective row of coupling links, the channel member being mounted on the front side of the tape with the teeth along the edges of the channel member being bent and pressing against the backside of the tape. Before the channel member is attached a pre-shaped bead may be formed at the free end of the filament over which the channel member is mounted.

---

This invention relates to a separable slide fastener and a method of making same.

As is well-known, a separable slide fastener comprises two tapes each carrying a row of coupling links, a slider for connecting and disconnecting said rows of coupling links and an open-end fitting at one end of said rows of coupling links.

It is an object of the invention to devise a novel form of an open-end fitting which is particularly suitable for application to a slide fastener in a continuous, automatic succession of operations.

Another object of the invention is to devise an open end fitting which is particularly suitable for use in connection with slide fasteners of the type in which each row of coupling links consists of a continuous filament, i.e. of nylon, which is formed with helical or meander shaped loops forming the coupling links.

A further object of the invention is to devise an open-end fitting which is simple and inexpensive to make and apply, and has an attractive appearance.

With these and other objects in view, which will be apparent to a man skilled in the art as the description progresses, the main feature of the invention is that the open-end fitting comprises a channel shaped terminal member attached to each of said tapes to form a termination of the respective row of coupling links, said channel member having its bottom portion located on one side of the respective tape, and being provided at the free edges of its lateral flanges with bent teeth pressed into said tape from the other side thereof, one of said terminal members carrying a socket for receiving the other.

The invention will in the following be explained in further detail with reference to the accompanying drawings in which.

Figure 1:
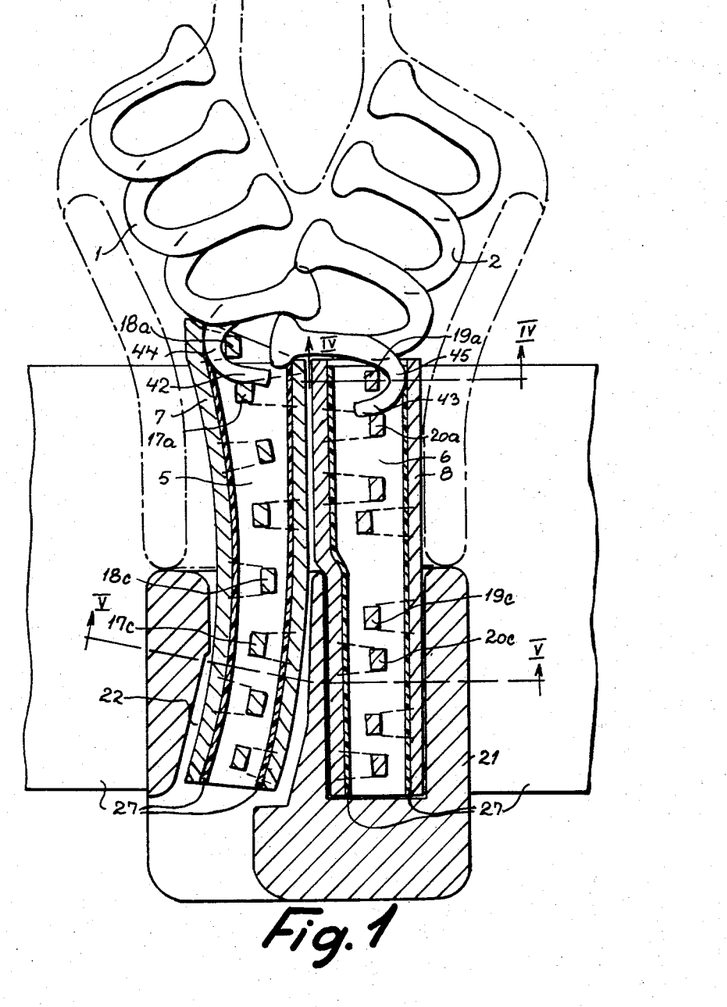
FIG. 1 shows, on a grossly enlarged scale, the lower ends of the rows of coupling links, the terminal element, the socket member and the contours of the slider of a separable slide fastener in accordance with one embodiment of the invention.
Figure 2:
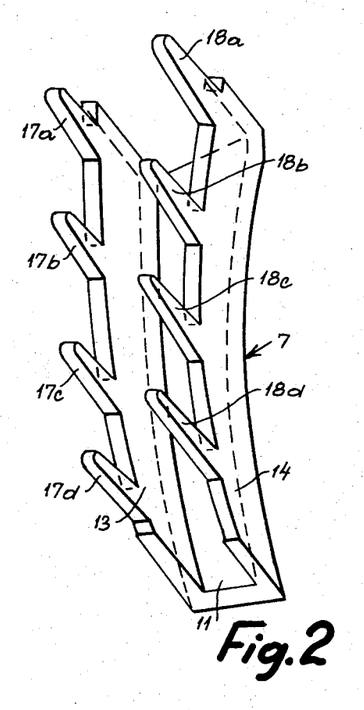
FIG. 2 a perspective view of one of the terminal elements as seen from the rear.
Figure 4:
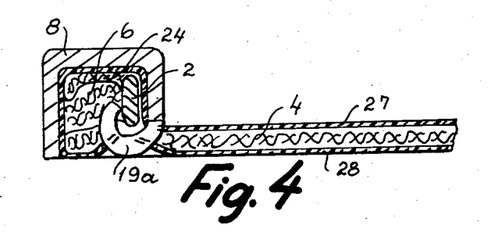
FIG. 4 a section along the line IV—IV in FIG. 1.
Figure 5:
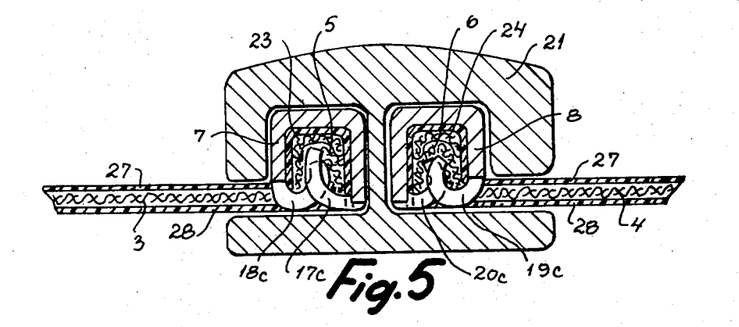
FIG. 5 a section along the line V—V in FIG. 1.
Figure 6:
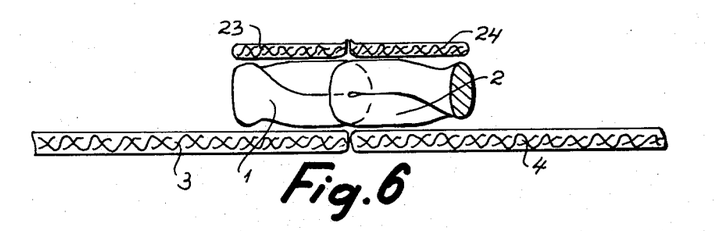
FIG. 6 a cross section through the coupled slide fastener in an intermediate point thereof.

In FIG. 1, 1 and 2 are the lower ends of two rows of coupling links which, in the embodiment illustrated, consist of continuous filaments formed with loops constituting the coupling links. The loops may be helical or meander shaped and may have any desired configuration with or without special coupling heads or noses, with curved or straight flanks that may lie close together or may be spaced from one another, and with longitudinally extending or inclined rear bends. In the following the interengaging portions of the loops will be referred to as the front ends or front bends thereof, while the opposite ends of the loops will be referred to as the rear ends or rear bends of the loops. The ends of the rows of coupling links illustrated in FIG. 1 will in the following be referred to as the lower ends because an open-end fitting is usually placed at the lower end of a slide fastener. The rows of coupling links are attached to tapes, which, however, for the purpose of clearness, are not illustrated in FIG. 1 but are illustrated in the sections in FIGS. 4 and 5 and 6 where the tapes are marked by the reference characters 3 and 4 respectively. In continuation of the rows of coupling links, beads 5 and 6 are formed on the tapes, such as will be described in further detail in the following. Channel shaped terminal elements 7 and 8, respectively, are pressed on to the said beads from the front side of the slide fastener. The shape of these terminal elements is most clearly apparent from FIGS. 2 and 3 where the terminal elements are shown in a perspective rear view. As will be seen, the terminal element 7 is curved, while the terminal element 8 is straight and has an upper wider portion 9 and a lower narrower portion 10. The terminal elements are placed in such a manner that their bottom portions 11 and 12 respectively are located on the front side of the slide fastener. At the edges of their lateral flanges 13, 14 and 15, 16 respectively the terminal elements are provided with teeth 17a–17d, 18a–18d and 19a–19d, 20a–20d respectively, which at the rear side of the slide fastener are bent over and pressed into the tapes from behind, the teeth 18a–18d and 19a–19d being first pressed through tthe tapes.

Figure 3:
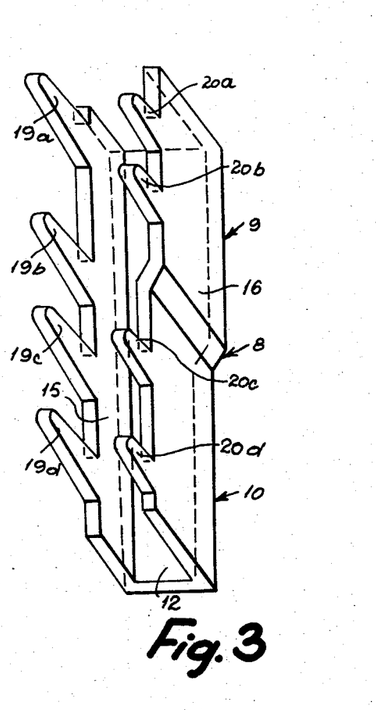
FIG. 3 is a similar view of the other terminal element.

As will be seen, the rows of coupling links are cut off through a loop portion 42 and 43, respectively, extending from the rear edge of the row of coupling links towards the front edge thereof so that the end of each row of coupling links is terminated by a rear bend 44 and 45, respectively. The teeth of the terminal members are so located that the outermost tooth 18a and 19a, respectively, on the outer flange of each terminal member engages the said outermost rear bend 44 and 45, respectively, of the row of coupling links, while the outermost tooth 17a and 20a, respectively, on the inner flange of each terminal member engages the outer side of the said cut-through loop portion 42 and 43, respectively, so that the cut-off ends of the filaments forming the rows of coupling links are very firmly held between the said teeth. In this manner, a very accurate and permanent mutual location of the rows of coupling links and the terminal elements is ensured without any danger of the terminal members, when applied, deforming the adjacent loops of the rows of coupling links. This is a problem which has caused considerable difficulty in previously proposed open-end fittings for separable slide fasteners of the type having rows of coupling links consisting of continuous filaments.

A socket member 21 is in known manner slid on to the narrower portion 10 of the terminal member 8, said socket having a passage 22 for receiving the other terminal member 7.

Figure 7:
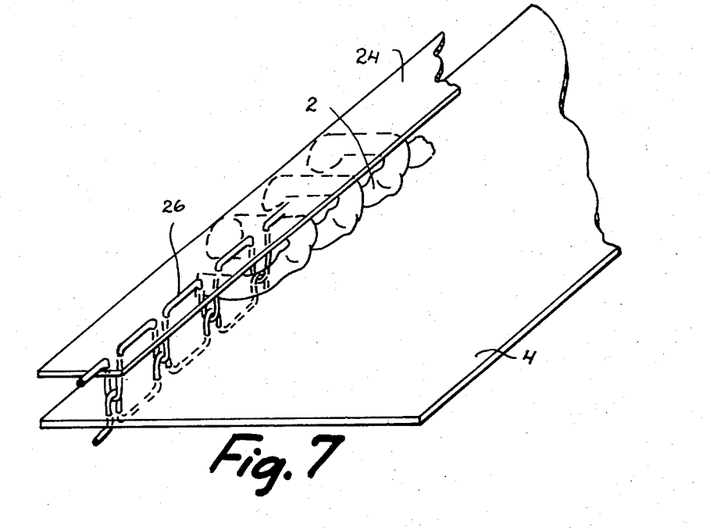
FIG. 7 a perspective view of the end of one row of coupling links, with tape and covering strip, in a stage preliminary to the completion of the side fastener.
Figure 8:
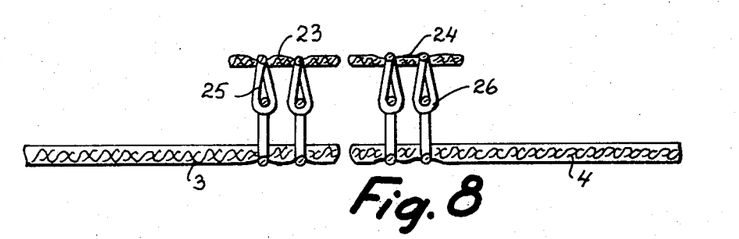
FIG. 8 a cross section through the ends of both tapes and covering strips extending beyond the rows of coupling links in the same stage as in FIG. 7.

The shape of the beads 5 and 6, and the manner in which they are formed in the embodiment illustrated, will be apparent from FIGS. 7 to 13. In FIG. 7 the slide fastener is illustrated as being of the type in which the row of couplings links 2, formed from a continuous filament, is attached by sewing to one face of the tape 4 with use of a covering strip 24 placed on top of the row of coupling links and concealing same. FIG. 7 illustrates that the covering strip 24 and the row of sewing stitches 26, by means of which this is connected with the tape 4, are continued beyond the end of the row of coupling links. FIG. 8 illustrates a corresponding cross section through both tapes 3 and 4 the covering strips 23 and 24 and the rows of sewing stitches 25 and 26.

Figure 9:
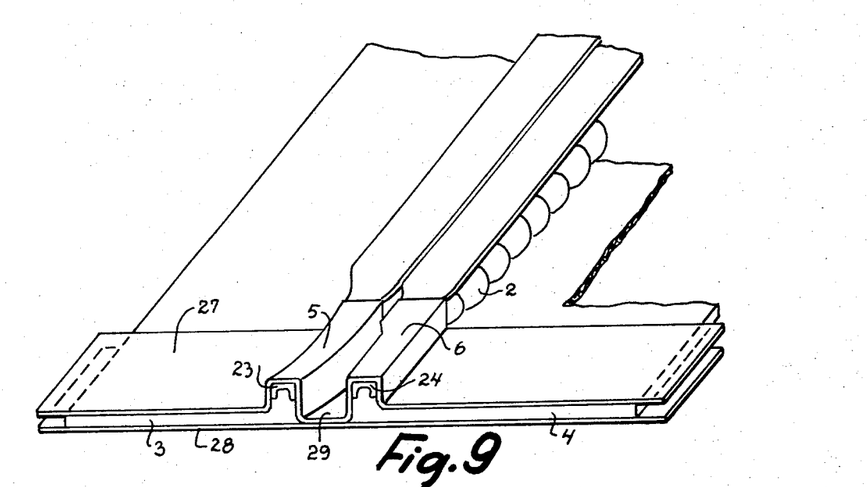
FIG. 9 a perspective view of the end of the slide fastener in a subsequent stage with applied transverse reinforcing strips that have been heat moulded to form beads.
Figure 10:
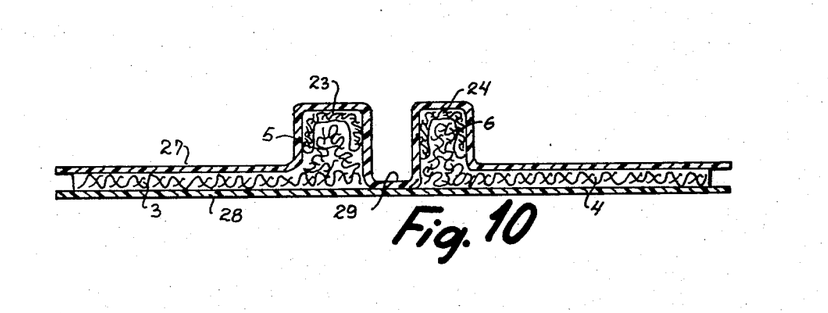
FIG. 10, on a larger scale, a cross section through the slide fastener adjacent the end thereof in the stage illustrated in FIG. 9.

FIGS. 9 and 10 illustrate that a transverse reinforcing strip 27 and 28, respectively, of thermoplastic material is applied to either side of the tapes, whereafter the reinforcing strip 27 is heat moulded to form the beads 5 and 6 while at the same time encasing the protruding ends of the covering strips 23, 24 and the rows of sewing stitches 25, 26. The reinforcing strips 27 and 28 are also outlined in FIG. 1. The beads 5 and 6 are formed in such a manner that they will also encase the free ends 42 and 43, respectively, of the filaments forming the rows of coupling links, thereby further contributing towards permanently maintaining a correct relationship between the rows of coupling links and the terminal members 8 and 9. In the heat moulding operation a fin 29 is produced between the beads 5 and 6. This is cut off in a subsequent operation while at the same time the reinforcing strips are cut clean along the sides of the tapes whereby the end of the slide fastener assumes the appearance illustrated in FIGS. 11 and 12. In a subsequent operation the terminal members 7 and 8 are pressed on to the beads 5 and 6, see FIG. 13, and all that is hereafter required to complete the open-end fitting is to slide the socket member 21 onto the terminal members 7 and 8 from the ends thereof and then to attach the socket member to the terminal member 8, which may take place by punching a depression into the rear wall of the socket member.

FIGS. 14 to 17 illustrate diagrammatically how a separable slide fastener of the type described can be made in fully automatic manner in a continuously progressing operation. The work piece used as a starting product is a continuous length of two tapes with mutually engaging rows of coupling links formed from continuous filaments. In a first operation station A the continuous rows of coupling links are split up into individual rows of desired lengths by cutting off the rows of coupling links in spaced points 30 and 31, whereafter the pieces of the rows of coupling links present between these points are withdrawn.

In a subsequent operating station B the reinforcing strips 27 and 28 are applied and the beads 5 and 6 are formed by a heat moulding operation, such as previously explained with reference to FIGS. 9 and 10.

Figure 11:
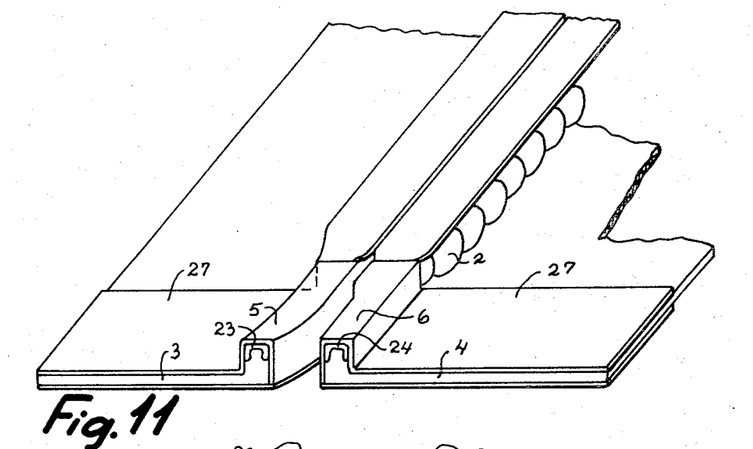
FIG. 11 a perspective view of the end of the slide fastener in a subsequent stage where the beads have been cut free from one another and the reinforcing strips have been cut clean along the edges of the tapes.
Figures 12, 13:
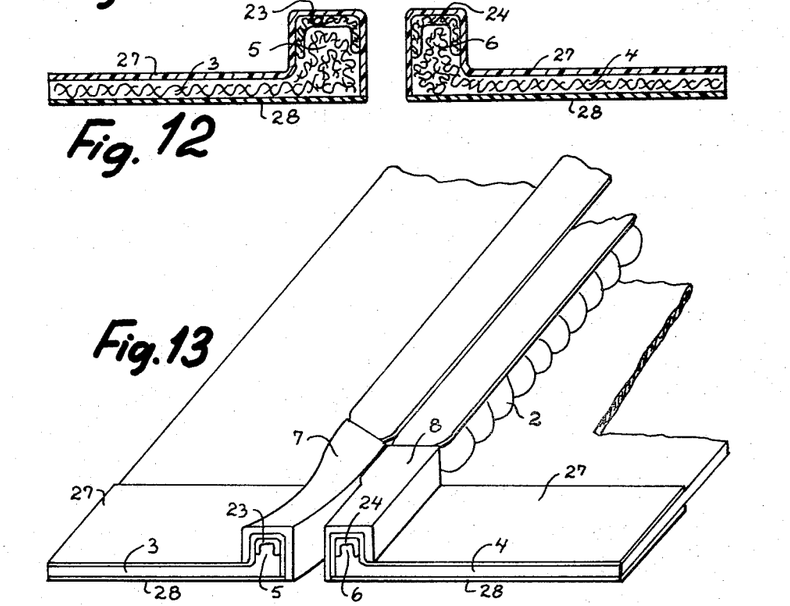
FIG. 12, on a larger scale, a cross section through the slide fastener adjacent the end thereof in the stage illustrated in FIG. 11.
FIG. 13 a perspective view of the end of the slide fastener after the application of the terminal elements to the beads.
Figure 14:
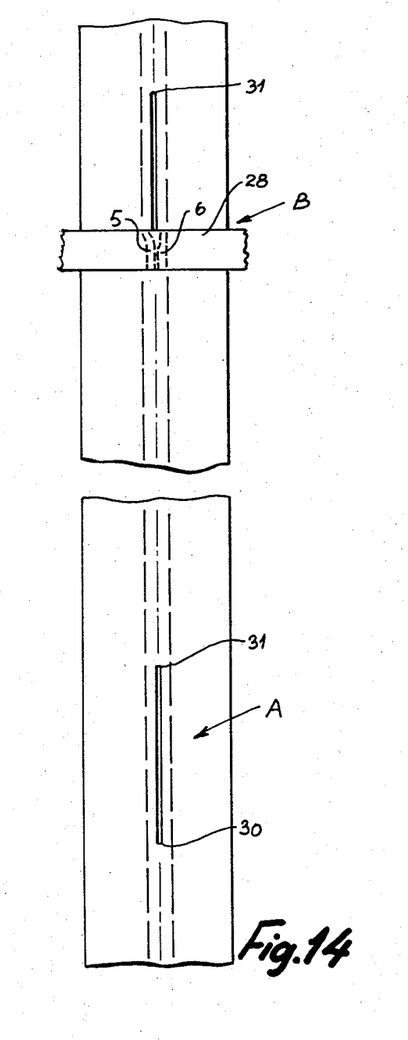
FIGS. 14, 15, 16 and 17 are diagrammatic figures illustrating various operating stations in the continuous production of a series of separable slide fasteners of the type illustrated in FIGS. 1–13.
Figure 15:
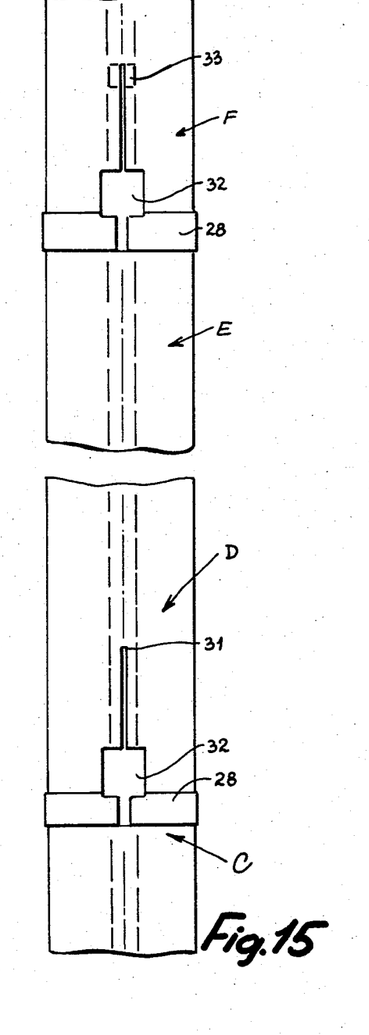
Figure 16:
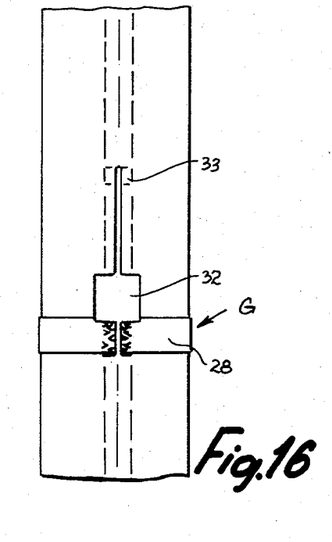

In the next operating station C a punching operation is performed by which the beads 5 and 6 are cut free from one another while at the same time the reinforcing strips 27 and 28 are cut clean along the side edges of the slide fastener, such as explained with reference to FIGS. 11 and 12. In the punching operation a wider hole 32 is also formed in the tapes at the ends of the beads.

Figure 17:
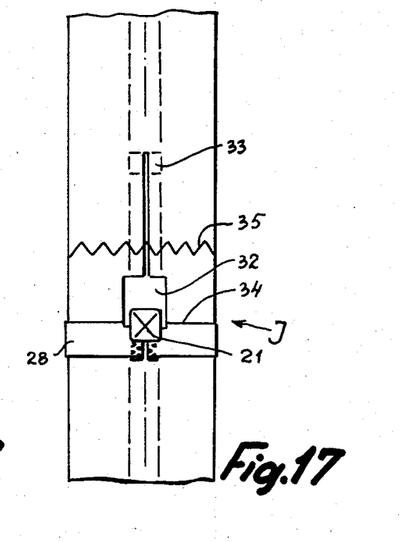

Now follow two operating stations D and E in which a slider (not shown) and a pair of stop members 33 are mounted on the rows of coupling links in a manner known per se, said stop members 33 being located in the completed slide fastener at the upper end thereof, i.e., the end remote from the open-end fitting. In an operating station F the channel shaped terminal members 7 and 8 are applied, such as illustrated in FIG. 13, and these may, if desired, be additionally clamped in a subsequent operating station G so that the teeth of the terminal members are firmly pressed into the tapes from the rear side thereof. In the next operating station H the socket member 21 is introduced into the wider hole 32 and is slid onto the terminal members 7 and 8 whereafter it is attached to the terminal member 8 by a punching operation on the rear side of the slide fastener. Finally, the slide fastener strip is severed in an operation station I in two positions, viz., partly along a straight cutting line 34 along the edge of the reinforcing strips 27 and 28 and partly along an undulated cutting line 35 at some distance from the cutting line 34. The cutting line 35 will then form the upper end of one slide fastener while the cutting line 34 will form the lower end of the next following slide fastener. After the severing operation in the operating station I, the slide fastener illustrated at the top of FIG. 17 is completely ready for sale.

While the invention has in the foregoing been described in detail with reference to the slide fasteners of the type in which the coupling links consist of loops of a continuous filament and are attached to the tape by sewing with use of a covering strip, it will be realized that the invention may also be used for any other type of slide fasteners, such as slide fasteners of the continuous filament type in which the rows of coupling links are attached to the tape in a different manner, i.e., only by a row of sewing stitches which may, to a greater or lesser extent, form a covering of the rows of coupling links, or where the rows of coupling links are united with the tapes by adhesion, and likewise the invention may be applied to slide fasteners with metal coupling links or extruded rows of coupling links.

I claim:

1. A separable slide fastener comprising two tapes each carrying a row of coupling links in the form of a continuous filament with a plurality of loops, a slider for connecting and disconnecting said rows of coupling links, and an open-end fitting at one end of said rows of coupling links, said open-end fitting comprising a channel shaped terminal member having inner and outer lateral flanges with a plurality of teeth along the edges thereof and mounted on the front side of the respective tape with the teeth of said inner flange passing through said tape and the edge of the outer flange being contiguous to the edge of said tape, said teeth being bent and pressed into the backside of said tape, one of said terminal members carrying a socket member for receiving the other.

2. A separable slide fastener as in claim 1 in which each terminal member is so placed as to slightly overlap the adjacent end of said continuous filament.

3. A separable slide fastener as in claim 2, wherein the free end of said filament is at a loop portion thereof extending towards the edge of the row of coupling links, said loop portion adjacent the free end being engaged by the first tooth adjacent the filament on the outer flange of the respective terminal member.

4. A separable slide fastener as in claim 3, wherein the free end of said continuous filament is clamped between the first teeth adjacent said filament on the inner and outer flanges respectively.

5. A separable sliding fastener as in claim 3, wherein said outer flange extends beyond said first tooth sufficiently to support the end of said filament.

6. A separable slide fastener as in claim 1, in which the free ends of the filaments are enclosed in pre-shaped beads.

7. A separable slide fastener as in claim 1, in which each row of coupling links is located between one face of a tape and an opposed face of a covering strip, and said covering strip extends beyond the end of the row and is encased in a heat moulded layer of thermoplastic material to form a bead.

References Cited

UNITED STATES PATENTS

| | | |
|---|---|---|
| 1,794,139 | 2/1931 | Blair. |
| 3,224,061 | 12/1965 | Taylor _________ 24—205.11 |

FOREIGN PATENTS

| | | |
|---|---|---|
| 1,059,377 | 6/1959 | Germany. |
| 622,318 | 4/1949 | Great Britain. |
| 898,652 | 6/1962 | Great Britain. |
| 971,876 | 10/1964 | Great Britain. |
| 271,097 | 1/1951 | Switzerland. |

BERNARD A. GELAK, *Primary Examiner.*